Jan. 12, 1943.  W. A. HYLAND ET AL  2,308,081
GRAIN DRILL
Filed May 7, 1941   2 Sheets-Sheet 1
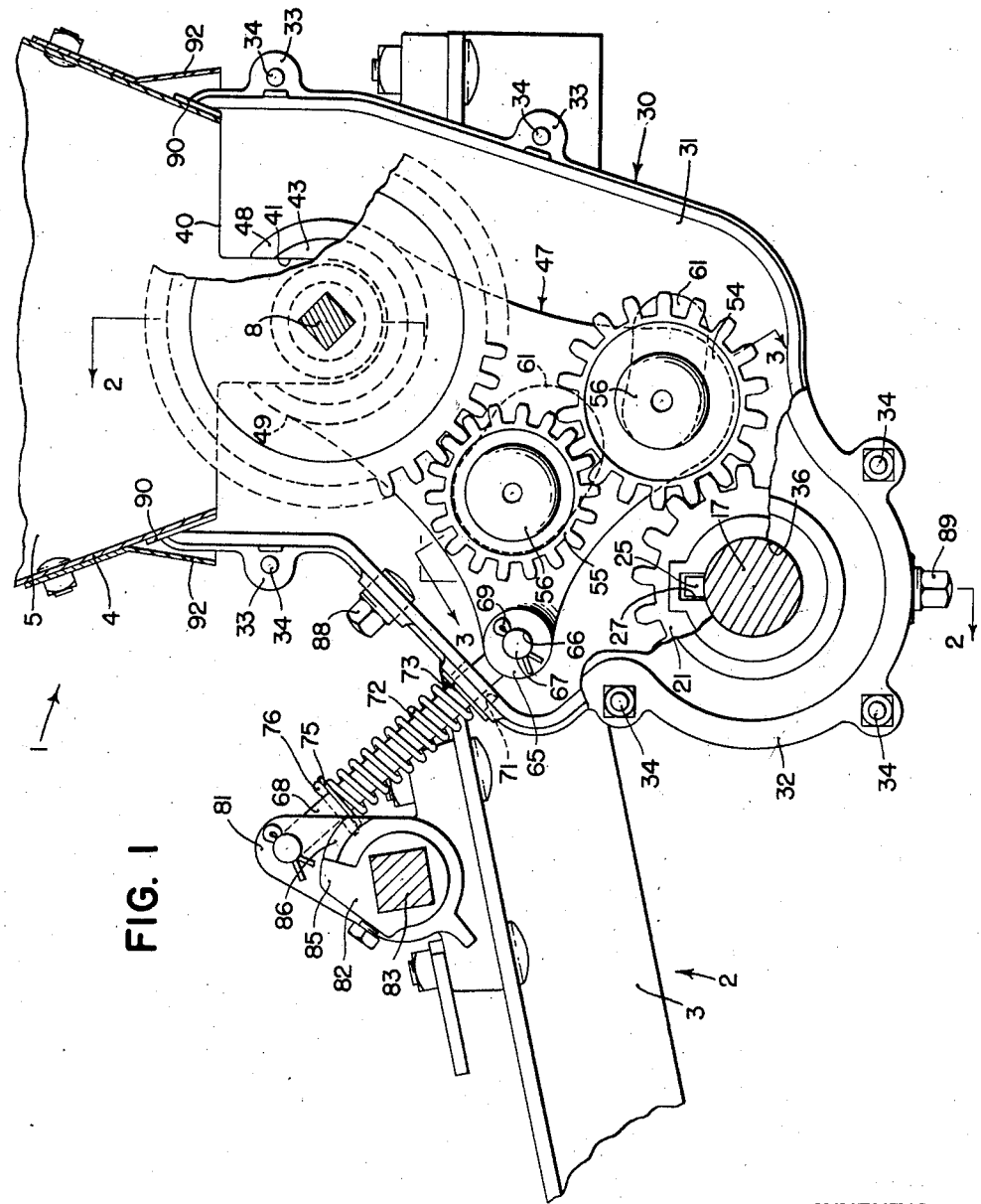
FIG. I
INVENTOR:
WILLIAM A. HYLAND
ROYCE R. BORNGRAEBER
BY 
ATTORNEYS.

Jan. 12, 1943. W. A. HYLAND ET AL 2,308,081
GRAIN DRILL
Filed May 7, 1941 2 Sheets-Sheet 2
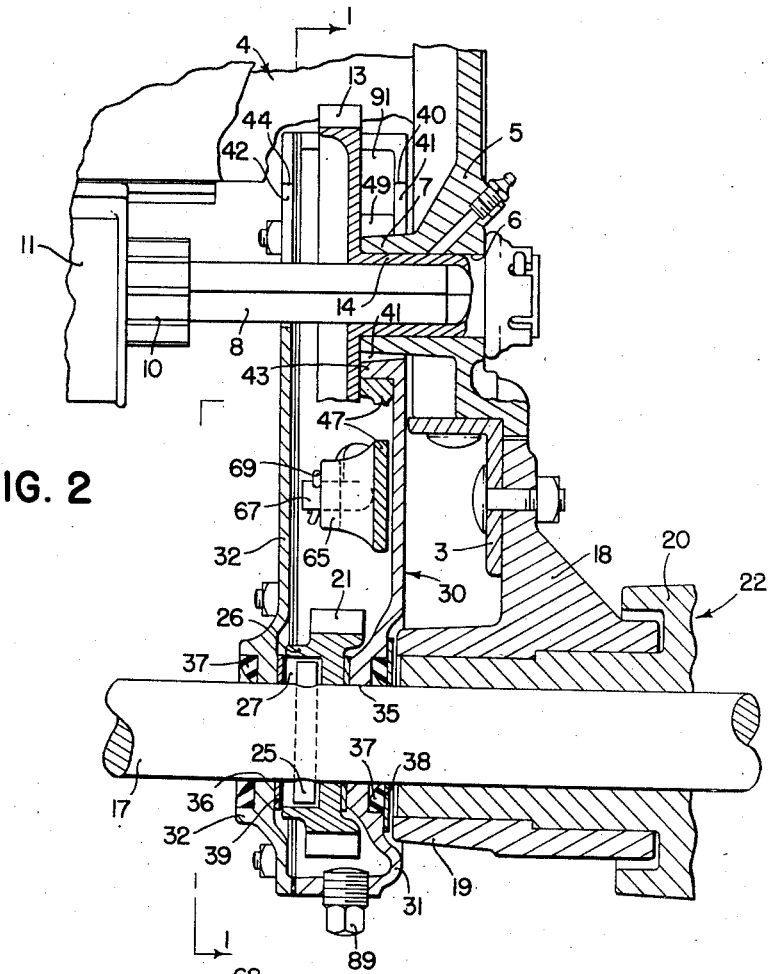
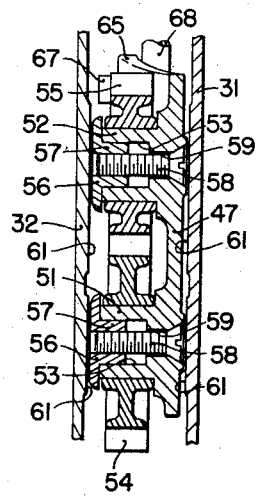
INVENTOR:
WILLIAM A. HYLAND
ROYCE R. BORNGRAEBER
BY
ATTORNEYS.

Patented Jan. 12, 1943

2,308,081

UNITED STATES PATENT OFFICE 2,308,081

GRAIN DRILL

William A. Hyland and Royce R. Borngraeber, Horicon, Wis., assignors to The Van Brunt Manufacturing Company, Horicon, Wis., a corporation of Wisconsin Application May 7, 1941, Serial No. 392,262

22 Claims. (Cl. 111—67)

The present invention relates generally to agricultural machines and more particularly to grain drills and like implements embodying gearing for driving a feed shaft from an axle shaft, which gearing is controllable.

The object and general nature of this invention is the provision of an enclosed gearing for grain drills and the like in which the gears transmitting the drive from the axle shaft to the feed shaft are enclosed and protected from dust, dirt and the like and run in a bath of oil, whereby smooth operation and long life are assured. Particularly, it is a feature of this invention to provide a simple enclosed gearing which may be thrown into and out of mesh, thereby serving as a clutch, fully enclosed in a lubricant-tight casing, but with the parts so constructed and arranged as to facilitate assembly during the manufacture of the machine. Further, it is a feature of this invention to provide an enclosed gearing which may be assembled more or less as a unit, the casing being so constructed that it may be applied over the grain drill feed shaft and the feed shaft gear after the latter are connected together.

A further feature of this invention is the provision of new and improved means for enclosing the drive gears of a grain drill of the fluted feed type. Another feature of this invention is the provision of a gearing unit including a swingable hanger for connecting and disconnecting the drive, and it is an additional feature of this invention to provide mechanism of this kind which is particularly constructed and arranged so as to ratchet when the drill or other machine is backed.

These and other objects and advantages of the present invention will be apparent to those skilled in the art after a consideration of the following detailed description, taken in conjunction with the accompanying drawings, in which:

Figure 1 is a sectional view looking laterally outwardly toward the drive gear casing, with parts of the inside cover broken away, corresponding generally to a section taken along the line 1—1 of Figure 2;

Figure 2 is a sectional view taken generally along the line 2—2 of Figure 1, showing one end of the seed box and the associated feed shaft and feed shaft gear;

Figure 3 is a fragmentary sectional view taken generally along the line 3—3 of Figure 1 showing the intermediate gears, one of which meshes with the feed shaft gear and the other of which is shiftable into and out of mesh with the axle gear.

Referring now more particularly to Figures 1 and 2, the machine in which the principles of the present invention have been exemplified consists of a grain drill, indicated generally by the reference numeral 1. The grain drill 1 includes a frame 2 which is made up of a number of bars, one of which consists of an angle bar 3 extending generally in a longitudinal direction. The frame 2 supports a seed box 4, the latter including box ends 5 which rest on and are bolted in any suitable manner directly to the frame bars 3. Each box end 5 is apertured, as at 6, and formed with a bushing 7 in which a feed shaft 8, preferably square in cross section, is disposed. The feed shaft 8 extends longitudinally of the seed box 4 and supports a plurality of fluted feed rolls 10 which rotate within feed cups 11 which communicate with the bottom of the seed box 4 to receive seed therefrom. The feed rolls 10 form parts of an adjustable-gate fluted force feed mechanism, the details of which per se do not form a part of the present invention. The feeds may be adjusted to plant any kind of seed in any desired quantity. The feed shaft 8 carries a feed gear 13 whose hub 14 is received in the bushing 7, the latter being formed as a part of the seed box end 5.

The seed box 4 is supported on axially aligned axle shafts 17 by means of axle boxes 18 which are bolted to the frame angles 3, each member 18 having a journal section 19 to receive the hub 20 of a supporting wheel 22 to which the associated shaft 17 is fixed. An axle gear 21 is fixed in any suitable manner to each axle shaft 17 and preferably is disposed in the plane of the associated feed shaft gear 13, as best shown in Figure 2. Preferably, the axle shaft 17 is apertured to receive a pin 25, and the hub 26 of the axle gear 21 is recessed, as at 27, to receive the pin, whereby the two parts are connected together in driving relation.

A casing 30 is disposed about the feed and axle shafts and their associated gears for the purpose of enclosing the gearing controllably connecting the drive, and this feature of the present invention will now be described. Each casing 30 is made up of two parts 31 and 32, the former comprising the casing proper and the latter serving as a cover for the casing. The cover is secured in place by apertured lugs 33 and securing bolts or set screws 34 passing through the apertures in the lugs. The casing parts 31 and 32 have aligned openings 35, 36 through which the associated axle shaft passes, and suitable sealing means 37 is provided so that the casing 30 is lubricant-tight at these points. Suitable thrust washers 38 and 39 are disposed between the axle gear 21 and the adjacent sides of the casing 30. The upper portions 40 and 44 of the casing parts 31 and 32 are provided with open end slots 41 and 42, respectively, in the upper portions of the casing parts 31 and 32. These slots at the open upper end of the casing 30 provides for passing the casing over the feed shaft and associated gear 13 after the latter has been disposed on the feed shaft 8. Surrounding the lower closed end of the slot 41 is an arcuate or annular boss 43, the external surface of which lies generally in a cylinder, the axis of which coincides with the axis of said feed gear and feed shaft. It will be noted, particularly from Figure 1, that the arcuate boss is not continuous but terminates adjacent the sides of the slot 41 so as to facilitate passing the casing 30 into position over the feed shaft 8 and feed shaft gear 13. However, the external diameter of the cylindrical boss section 43 is appreciably greater than the width of the slot 41. Mounted for swinging movement on the arcuate boss 43 is a gear hanger 47, the upper end of which is bifurcated so as to present two arcuate arms 48 and 49 having their inner surfaces formed as portions of a cylinder corresponding with the external surface of the arcuate boss 43. However, the ends of the arms 48 and 49 are spaced apart only a distance corresponding to the width of the slot 41. Thus, the gear hanger 47 may be disposed in place on its supporting boss 43 before applying the casing 30 to the feed shaft and feed shaft gear, yet this rocking support of the gear hanger, since the diameters of the above-mentioned cylindrical surfaces are greater than the width of the slot, does not interfere with the disposition of the casing 30 over the feed shaft gear and adjacent portions of the feed shaft. Each gear hanger 47 is formed, as best shown in Figure 3, with a pair of gear receiving studs 51 and 52, preferably identical, each stud being hollow or recessed, as indicated at 53. Intermeshing gears 54 and 55 are disposed for rotation on the studs 51 and 52, and each gear is held in position by a cap 56 having a central apertured section 57 receiving the inner end of a screw 58 that is inserted through an opening 59 in the gear hanger 47. The cap 56 bears against the end of the stud 51 so that the cap may be securely tightened without binding the associated gear. The gear 54 on the other stud 52 is held in place by identical means. From Figure 2 it will be noted that the casing parts 31 and 32 are spaced apart to receive the gear hanger and associated gears, but the spacing is sufficiently close that the cap members 56 and fastening screws 58 are not permitted to become detached, even through these parts should be loosened. Each of the casing parts 31 and 32 is provided with a raised boss, each being indicated by the reference numeral 61, adjacent the heads of the screws 58 and the cap members 56.

Preferably, the implement is set up by first mounting the casing 30 and associated parts on the axle 17, including the bearing 20 and the bearing bracket 18, with the gear 21 keyed to the axle 17 and the swinging hanger 47 mounted on the segmental boss 43. Then this assembly is connected to the seed box, preferably by having the latter turned upside down and then passing the slotted portions of the casing and the arcuate bosses 43 and 48 over the feed shaft 8 and the gear 13, after which the bearing bracket 18 may be connected to the angle 3, after which the other bearings (not shown) attaching the axle 17 to the seed box and frame may be connected.

The gear hanger 47 is provided with an extension 65 which is apertured, as at 66, to receive the laterally turned end 67 of a throwout rod 68. The laterally turned ends is apertured to receive a cotter key 69 by which the end 67 is held in position in the gear hanger extension 65. The throwout rod 68 extends outwardly through an opening 71 in the casing part 31, and the opening 71 is appreciably larger than the rod 68 so as to accommodate the swinging movement of the gear hanger 47 about the axis of its pivotal support, which axis is coincident with the axis of the feed shaft 8. A spring 72 surrounds the rod 68 exteriorly of the casing 30 and at one end bears against a sealing washer 73 and holds the latter tightly against a flat section of the casing surrounding the opening 71, thereby preventing the leakage of lubricant at this point. At its other end the spring 72 bears against a washer 75 which is held in position relative to the rod 68 by a cotter key 76.

Any suitable means may be provided for actuating the throwout rod 68, but preferably we provide an arm 81 mounted for rocking movement on a member 82 which is non-rotatably disposed on a square lifting shaft 83 that is suitably supported on the grain drill frame 2 and connected for raising and lowering the disks or other furrow openers. The member 82 carries an extension 85 which is adapted to engage a lug 86 formed on the throwout arm 81, whereby when the lifting shaft 83 is rocked in a clockwise direction (Figure 1), the extension 85 engages the lug 86 and rocks the throwout arm 81 in a clockwise direction against the force of the spring 72, thereby rocking the gear hanger 47 in a counterclockwise direction about the axis of the feed shaft 8. This swinging movement of the gear hanger carries the gear 54 away from the drive gear 21 on the axle shaft 17, thus disconnecting the drive. The gears 21 and 54, with associated parts, thus act as clutch means disposed within the lubricant-tight housing 30. The latter is provided with an opening in the upper portion which is tapped to receive a filler plug 88 by which lubricant may be introduced into the casing 30. Similarly, a drain plug 89 is provided in the lower portion so that lubricant may be drained from the casing whenever it is desired to replace the lubricant therein.

The front and rear walls of the casing 30 extend upwardly, as at 91, above the edges 40 and 44 and receive the adjacent portion of the seed box 4. Gaskets 90 are provided so as to secure a tight connection between the parts at this point. The bracket 18 which fixes the axle shaft 17 in position relative to the frame also serves to position the gear housing 30, since the seed box is also fixed directly to the frame. Hence, no additional fastening means need be provided for connecting the gear case 30 to the seed box. A shield 92 is adapted to be secured to each side of the seed box and is formed so as to embrace the adjacent portion of the upper end of the gear case 30. The shields prevent the entrance of water, dirt and the like into the upper end of the casing.

While we have shown and described above the preferred structure in which the principles of the present invention have been incorporated, it is to be understood that our invention is not to be limited to the particular means shown and described above, but that, in fact, widely different means may be employed in the practice of the broader aspects of our invention.

What we claim, therefore, and desire to secure by Letters Patent is:

1. In a grain drill or the like, a seed box having a seed shaft and a gear thereon, a casing secured to said seed box and receiving at least a part of said gear, an axle extending into said casing at a point spaced from its attachment to the seed box, said casing being lubricant-tight in at least the portion receiving said axle, and means operatively connecting said axle and said gear in driving relation when the casing is attached to said seed box.

2. In a grain drill or the like having a seed box including a seed shaft and a gear thereon disposed in the lower portion of said seed box, a casing lubricant-tight at its lower portion and having an open upper end adapted to be attached to said seed box and to receive at least a portion of said gear, means for fixing the open upper end to said seed box in a position to embrace said gear, and means in the lower portion of said casing for operative connection with said gear for driving said seed shaft.

3. The invention set forth in claim 2, further characterized by the upper portion of said casing having an open end slot therein to provide for passing the upper portion of said casing over said gear and shaft when attaching the casing to said seed box.

4. In a grain drill or the like having a seed box including a feed shaft and a gear thereon, a lubricant-tight casing having an open upper end for receiving at least a part of said gear, said casing being slotted to provide for passing the casing over said shaft in embracing relation with respect to the gear thereon, the slotted portion of the casing including a slotted boss, shaft means extending into the lower portion of said casing, a gear on said shaft means within said casing, and means swingably supported on said slotted boss within said casing for optionally connecting the gear on said axle means with said first-mentioned gear.

5. The invention as set forth in claim 4, further characterized by means extending into said casing in sealed relation from the exterior thereof for operating said swingable means.

6. In a grain drill or the like having a seed box including a feed shaft and a gear thereon, a lubricant-tight casing having an open upper end, at least one wall of which is slotted to provide for passing said casing over said shaft with said gear extending into the casing, the slotted portion of said casing including a slotted boss, the exterior surface of which is concentric with respect to said shaft, shaft means extending into the lower portion of the casing, a gear disposed within said casing on said shaft means, a gear hanger having a slotted upper end formed so as to be swingably supported on said slotted boss and to be passed over said feed shaft with said casing, gear means supported on said swingable gear hanger and meshing with said feed shaft gear, and means for swinging said gear hanger so as to move said gear means into and out of engagement with the gear on said shaft means.

7. In a grain drill or the like including a lubricant-tight casing and movable means disposed in said casing, said casing having an aperture in one wall thereof, a member extending into said casing through said aperture and operatively connected to shift said movable means, a spring surrounding said member exteriorly of said casing and reacting at one end against said member for holding said movable means in one position in said casing, and a sealing member disposed about said movable member and held in place against said casing surrounding the aperture therein by said spring means, whereby leakage of lubricant through said aperture is prevented.

8. In a grain drill or the like having a shaft and a gear thereon, a casing having an open end adapted to receive said gear and a slotted portion to provide for passing said casing over said shaft so as to dispose said gear at least partially within said casing, a rockable member disposed within said casing and slotted so as to receive said shaft, and cooperating means on said casing and said rockable member for supporting the latter for rocking movement about an axis coinciding with the axis of said shaft and gear when said casing is disposed in a position receiving the latter.

9. In a grain drill or the like, a member having a slot with an open end, a second member rockable with respect to said first member and also having a slot generally in register with the slot in said first member, whereby both members may be disposed about a part, and cooperating means on said members whereby the second is supported on the first for rocking movement about an axis coinciding with the part disposed within said slots.

10. In gearing comprising driving and driven shafts having driving and driven gears mounted thereon, respectively, controllable connecting means therefor comprising supporting means having a slotted pivot, a gear hanger having a slotted part swingably mounted on said pivot, the slotted portions of said pivot and hanger providing for the disposition of said supporting means and said hanger in operative position about one of said shafts, and gear means carried by said gear hanger in a position to be engaged with the gear on said one shaft and to be optionally engaged with the gear on the other shaft, when the supporting means and gear hanger are disposed in said operative position.

11. The combination with gearing comprising driving and driven shafts having driving and driven gears mounted thereon, respectively, of supporting means having a slotted pivot, a gear hanger having a slotted part swingably mounted on said pivot, the slotted portions of said pivot and hanger providing for the disposition of said supporting means and said hanger in operative position about one of said shafts, and gear means carried by said gear hanger in a position to be engaged with the gear on said one shaft and to be optionally engaged with the gear on the other shaft, when the supporting means and gear hanger are disposed in said operative position.

12. The combination with gearing comprising driving and driven shafts having driving and driven gears mounted thereon, respectively, a casing enclosing one of said gears and the adjacent portion of the associated shaft and having a slotted pivot, a gear hanger disposed within said casing and having a slotted part swingably mounted on said pivot, the slotted portions of said pivot and hanger providing for the disposition of said casing and said hanger in operative position about the other of said shafts, and gear means carried by said gear hanger in a position to be engaged with the gear on said other shaft and to be optionally engaged with the gear on the other shaft, when the casing and gear hanger are disposed in operative position.

13. In a grain drill or the like having an axle, a seed box, and a feed shaft disposed below the bottom of said seed box, a casing surrounding said axle in lubricant-tight relation and having a slotted part at its upper end adapted to receive said feed shaft to provide for assembling said casing and shaft on the seed box by passing the slotted portion of said casing over said feed shaft into a position where the casing engages said seed box.

14. In a grain drill or the like having an axle, a seed box, a feed shaft disposed below the bottom of said seed box, and a gear on said feed shaft, a casing surrounding said axle in lubricant-tight relation and having a slotted part at its upper end adapted to receive said feed shaft to provide for assembling said casing and shaft on the seed box by passing the slotted portion of said casing over said feed shaft into a position where the casing engages said seed box, and means within said casing connected with said axle and disposed in a position to connect with said gear on the feed shaft when said casing is assembled on the seed box.

15. In a grain drill or the like including a lubricant-tight casing and movable means disposed in said casing, said casing having an aperture in one wall thereof, a member extending into said casing through said aperture and operatively connected to shift said movable means, resilient means acting against said member for holding said movable means in one position in said casing, and a sealing member disposed about said movable member and held in place against said casing about the opening through which said member extends by said resilient means, whereby leakage of lubricant through said opening is prevented.

16. In a grain drill or the like including driving and driven parts, a lubricant-tight casing enclosing certain of said parts, and movable means for controlling the connection between said driving and driven parts, said movable means being disposed in said casing and said casing having an aperture in one wall thereof, a controlling member extending into said casing through said aperture and operatively connected to shift said movable means in one direction, resilient means acting against said controlling member for shifting said movable means in the other direction, and a sealing member receiving the reaction of said resilient means and disposed about said movable member and held in place against said casing surrounding the aperture therein by said resilient means, whereby leakage of lubricant through said aperture is prevented.

17. In a grain drill or the like including a shaft and a gear on the under side thereof, a casing open at its upper end and closed at its lower end, and gear means disposed interiorly of the casing, said casing having its upper end formed to embrace, at least partially, said shaft and gear so as to place the latter in mesh with said gear means.

18. In a grain drill or the like including a seed box and a shaft and a gear on the shaft on the under side of said seed box, a casing open at its upper end and closed at its lower end, said casing having seed box receiving means at its upper end and open end slots in the walls at its upper end, and gear means disposed interiorly of the casing, said slots providing for placing the upper end of said casing about said shaft and gear, with said gear means meshing with said gear and said seed box receiving means in engagement with said seed box.

19. In a grain drill or the like having a seed box including a feed shaft and a gear thereon, a member receiving said shaft and including means serving as a boss, the exterior surface of which is concentric with respect to said shaft, shaft means having a gear thereon, a gear hanger having a slotted upper end formed so as to be passed over said feed shaft and swingably supported on said boss means, gear means supported on said swingable gear hanger and operatively connected with said feed shaft gear, and means for swinging said gear hanger so as to move said gear means into and out of engagement with the gear on said shaft means.

20. In a grain drill or the like having a seed box including a feed shaft and a gear thereon, a member receiving said shaft and including means serving as a boss, the exterior surface of which is concentric with respect to said shaft, an axle shaft also received by said member, a gear on said axle shaft adjacent said member, a gear hanger having a slotted upper end formed so as to be passed over said feed shaft and swingably supported on said boss means, gear means supported on said swingable gear hanger and operatively connected with said feed shaft gear, and means for swinging said gear hanger so as to move said gear means into and out of engagement with the gear on said axle shaft.

21. In a grain drill or the like including a lubricant-tight casing and movable means disposed in said casing, said casing having an aperture in one wall thereof, a member extending into said casing through said aperture and operatively connected to shift said movable means, said member being shiftable laterally, inwardly and outwardly relative to the casing, a sealing member disposed about said movable member in substantially leak-tight relation and movable with said member relative to said casing in a lateral direction, and spring means acting against said member for holding it in place against said casing surrounding the aperture therein while accommodating said lateral movement of the sealing member, whereby leakage of lubricant through said aperture is prevented.

22. In a grain drill or the like having an axle, a seed box, and a feed shaft, a casing surrounding said axle in lubricant-tight relation and having a slotted part at its upper end adapted to receive said feed shaft to provide for assembling said casing and shaft on the seed box by passing the slotted portion of said casing over said feed shaft into a position where the casing engages said seed box.

WILLIAM A. HYLAND.
ROYCE R. BORNGRAEBER.